United States Patent
Klinghult et al.

(10) Patent No.: US 7,997,746 B2
(45) Date of Patent: Aug. 16, 2011

(54) ARRANGEMENT FOR GENERATING DUAL IMAGES

(75) Inventors: Gunnar Klinghult, Lund (SE); Mats Kleverman, Helsingborg (SE); Richard Nilsson, Lund (SE); Kent Ådán, Lund (DE); Torbjörn Karlelid, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 326 days.

(21) Appl. No.: 11/996,703

(22) PCT Filed: Jun. 29, 2006

(86) PCT No.: PCT/EP2006/063683
§ 371 (c)(1), (2), (4) Date: Jul. 30, 2008

(87) PCT Pub. No.: WO2007/012540
PCT Pub. Date: Feb. 1, 2007

(65) Prior Publication Data
US 2009/0154191 A1    Jun. 18, 2009

Related U.S. Application Data (60) Provisional application No. 60/705,340, filed on Aug. 4, 2005.

(30) Foreign Application Priority Data

Jul. 26, 2005 (EP) .................................. 05016152

(51) Int. Cl.
*F21V 9/16* (2006.01)
*H01H 9/00* (2006.01)

(52) U.S. Cl. ........... 362/84; 362/559; 362/97.1; 362/24; 200/5 A; 200/310; 200/311

(58) Field of Classification Search ................... 362/559, 362/85, 95, 97.1, 253, 84, 24; 200/310–317, 200/5 A, 184, 183, 51.06, 61.02; 340/815.45, 340/815.17, 815.48, 815.53, 815.55, 815.56, 340/815.65; 40/543; 250/461.1; 341/20–30; 379/422, 433
See application file for complete search history.

(56) References Cited

U.S. PATENT DOCUMENTS 5,408,060 A * 4/1995 Muurinen ..................... 200/314
(Continued)

FOREIGN PATENT DOCUMENTS
DE         32 35 752       3/1984
(Continued)

OTHER PUBLICATIONS

International Search Report for corresponding PCT Application No. PCT/EP2006/063683 mailed Oct. 10, 2006.

*Primary Examiner* — Anabel M Ton
*Assistant Examiner* — Danielle Allen
(74) *Attorney, Agent, or Firm* — Renner, Otto, Boisselle & Sklar, LLP (57) ABSTRACT

An arrangement and method for displaying at least a first and a second image. The arrangement comprises at least one light source (120, 121, 220, 221, 320, 321) adapted to generate light having at least a first and a second light characteristic; and at least a first and a second image forming element (122, 123, 222, 223, 322, 323) arranged to display a first and a second image (128, 129, 230, 231), respectively. The first image forming element (122, 222, 322) is at least responsive to the light having the first light characteristic. The second image forming element (123, 223, 323) is at least responsive to the light having the second light characteristic.

14 Claims, 6 Drawing Sheets

U.S. PATENT DOCUMENTS

| | | | | |
|---|---|---|---|---|
| 5,950,809 A * | 9/1999 | Andre | | 200/314 |
| 5,960,942 A * | 10/1999 | Thornton | | 200/314 |
| 6,761,462 B2 * | 7/2004 | Yoshida | | 362/109 |
| 7,073,916 B2 * | 7/2006 | Yin et al. | | 362/84 |
| 2004/0066317 A1 * | 4/2004 | Al-Raheem | | 341/22 |
| 2004/0239648 A1 * | 12/2004 | Abdallah et al. | | 345/173 |

FOREIGN PATENT DOCUMENTS

| | | |
|---|---|---|
| DE | 41 07 841 | 9/1992 |
| EP | 0 508 563 | 10/1992 |
| EP | 1 523 021 | 4/2005 |
| FR | 2 863 724 | 6/2005 |
| GB | 2 246 099 | 1/1992 |

* cited by examiner

ARRANGEMENT FOR GENERATING DUAL IMAGES

This application is a §371 of International Application No. PCT/EP2006/063683 filed on Jun. 29, 2006, which claims benefit to U.S. Provisional Application No. 60/705,340 filed on Aug. 4, 2005, and also claims priority to European Application No. 05016152.0 filed on Jul. 26, 2005.

TECHNICAL FIELD OF THE INVENTION

The present invention relates to an arrangement for generating at least a first and a second image for a man-machine interface.

DESCRIPTION OF RELATED ART

An electronic apparatus may comprise a man-machine interface, through which a user may interact with the apparatus. The man-machine interface may comprise one or several input devices, such as one or several keys, a joystick, or a rocker pad.

A portable or handheld apparatus, such as a mobile terminal, may provide various functionalities, such as communication, games, and multi-media rendering. For each functionality, the portable apparatus may be put in a corresponding operational mode, such as a communication mode, a game mode, and/or a multi-media mode. In each mode, the user may operate the apparatus by interacting with the man-machine interface.

The portable apparatus may comprise several operational modes. To decrease the number of input devices necessary, each input device may be used in connection with different functionalities depending on the operational mode. For example, in the communication mode, a single key may be used for entering a "1", whereas the same key in the multi-media mode may be used for initiating a "play" command for rendering multi-media data.

For easy operation of the portable apparatus, symbols may be provided in connection with a corresponding input device. The symbol relating to the functionality may be formed integral with or formed at the input device. If each input device is associated with several functionalities, several symbols may need to be provided in connection with each input device. This may be a problem as the physical area available in a portable communication apparatus for each input device is limited. The symbols have to be relatively small, wherein they may be illegible. Furthermore, it may be difficult to distinguish the symbols from each other and be confusing for the user as the current functionality of the input device may be unclear.

SUMMARY OF THE INVENTION

It is an object of the invention to provide an arrangement including images for a man-machine interface.

According to a first aspect, an arrangement for displaying at least a first and a second image, comprises at least one light source adapted to generate light having at least a first and a second light characteristic; at least a first and a second image forming element arranged to display a first and a second image, respectively. The first image forming element is at least responsive to the light having the first light characteristic. The second image forming element is at least responsive to the light having the second light characteristic.

The at least one light source may be adapted to generate light in a first and a second spectral range. The first light characteristic may be the first spectral range and the second light characteristic may be the second spectral range. The first and second spectral ranges may be non-overlapping or at least partly overlapping.

The at least one light source may be adapted to generate light in at least one spectral range. Different frequencies of the spectral range may have at least a first and a second intensity. The first light characteristic may be the first intensity and the second light characteristic may be the second intensity.

The arrangement may comprise a first and a second light source. The first light source may be adapted to generate light having the first light characteristic. The second light source may be adapted to generate light having the second light characteristic.

The first image forming element may comprise a first optical component for providing light having a first characteristic. The second image forming element may comprise a second optical component for providing light having a second characteristic, which is different from the first characteristic. Thus, it is possible to distinguish between the images by determining whether the optical components provide light having the first or the second characteristic.

The first optical component may at least be responsive to the light having the first light characteristic. The second optical component may at least be responsive to the light having the second light characteristic.

The first image forming element may be arranged to not be responsive to the light having the second light characteristic. The second image forming element may be arranged to not be responsive to the light having the first light characteristic.

The first image forming element and the second image forming element may be arranged to display the first and the second image, respectively, in a single physical area.

The first image forming element and the second image forming element may be arranged to display the first and the second images in a non-overlapping fashion.

The first image forming element and the second image forming element may be arranged to display the first and the second images in an at least partly overlapping fashion.

The first optical component may comprise a first light filter and the second optical component may comprise a second light filter.

A first light source may be adapted to generate planar polar light having a first polarization. The light filter of the first optical component may be adapted to transfer planar polar light from the first light source. A second light source may be adapted to generate planar polar light having a second polarization, which is different from the first polarization. The second polarization may be orthogonal to the first polarization. The light filter of the second optical component may be adapted to transfer planar polar light from the second light source.

The first light filter and the second light filter may be color filters. The first light filter may be adapted to transfer light having the first light characteristic. The second light filter may be adapted to transfer light having the second light characteristic.

Each of the first image forming element and the second image forming element may comprise a transparent element and a non-transparent portion for forming the first and the second image, respectively.

The first image forming element may comprise phosphorescent material forming the first image. A first light source may be adapted to generate light having sufficient energy for exciting the phosphorescent material. A second light source may be adapted to generate light having lower energy than the energy needed for exciting the phosphorescent material. The energy generated by the first light source may be the first light characteristic and the energy generated by the second light source may be the second light characteristic.

The first image forming element may comprise a filter for blocking light from a first light source and transfer light from a second light source.

The phosphorescent material may be transparent for light generated by the second light source.

The second image forming element may comprise a transparent carrier with a non-transparent image applied thereon.

The first image forming element and the second image forming element may together comprise first and second axially arranged color filters. Each color filter may include a screen pattern, which is not overlapping the screen pattern of the other color filter. The screen patterns may form the first and the second image. The first color filter may be adapted to at least transfer the light having the first light characteristic. The second color filter may be adapted to at least transfer the light having the second light characteristic.

The screen patterns may comprise cut-outs formed by geometric primitives.

At least contours of the first and the second image may be provided on or in a layer axially arranged with the first and the second image forming element and being exposable to daylight. The contours may comprise phosphorescent material.

According to a second aspect, an electronic apparatus comprises the arrangement for displaying at least a first and a second image.

The electronic apparatus may be a portable or handheld mobile radio communication equipment, a mobile radio terminal, a mobile telephone, a pager, a communicator, an electronic organizer, a smartphone a computer, or a multimedia player.

According to a third aspect, a method for displaying at least a first and a second image, comprises controlling generation of light from at least one light source having a first and a second light characteristic; receiving light having the first light characteristic at least at a first image forming element; displaying a first image by means of the first image forming element; receiving light having the second light characteristic at a second image forming element; and displaying a second image by means of the second image forming element.

According to a fourth aspect, a method for creating an image forming element comprises applying at least a first color filter on a first surface of a carrier; exposing the first color filter to laser light in a first spectral range, which is absorbed by the first color filter.

The method for creating an image forming element may comprise applying a second color filter on a second surface of the carrier; and exposing the second color filter to laser light in a second spectral range, which is absorbed by the second color filter. The step of exposing the first color filter may comprise exposing the first color filter to laser light in a spectral range, which is not absorbed by the second color filter, and the step of exposing the second color filter comprises exposing the second color filter to laser light in a spectral range, which is not absorbed by the first color filer.

According to a fifth aspect, a computer program product comprises computer program code means for executing the method for displaying at least a first and a second image, when said computer program code means are run by an electronic device having computer capabilities.

According to a sixth aspect, a computer program product comprising computer program code means for executing the method for creating an image forming element, when said computer program code means are run by an electronic device having computer capabilities.

Further embodiments of the invention are defined in the dependent claims.

It is an advantage of the invention that a plurality of images may be generated, which are not confusing for the user.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features and advantages of the invention will appear from the following detailed description of the invention, reference being made to the accompanying drawings, in which:

FIGS. 3b-3c are top-views of a first and a second image generated according to the embodiment of FIG. 3a;

FIG. 3d is a top-view of an alternative embodiment of the arrangement of FIG. 3a;

FIGS. 4b-4c are top views of a first and a second image generated according to the embodiment of FIG. 4a;

FIG. 5b is a cross-sectional view of an alternative embodiment of the arrangement of FIG. 5a;

FIG. 5c is a cross-sectional view of an alternative embodiment of the arrangement of FIG. 5a;

DETAILED DESCRIPTION OF EMBODIMENTS

Figure 1:
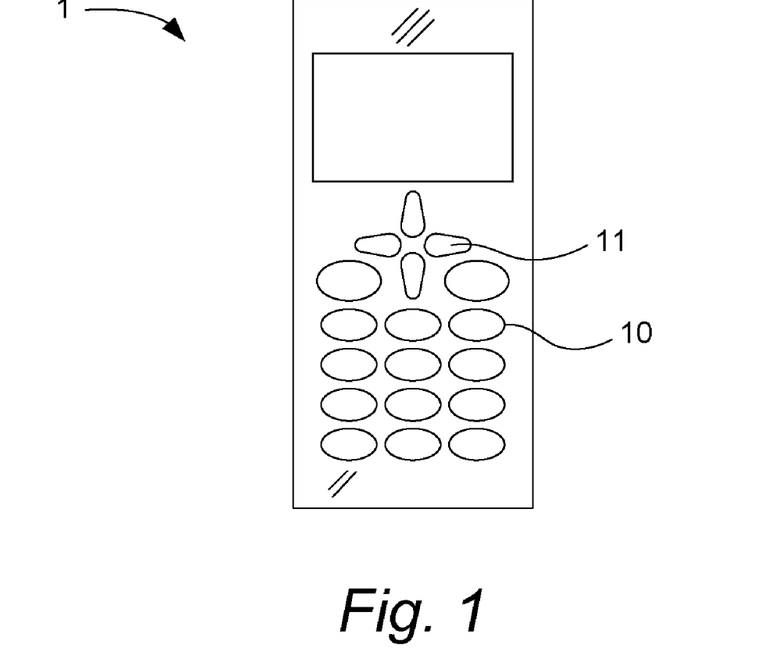
FIG. 1 is a front-view of an electronic apparatus.

FIG. 1 illustrates an electronic apparatus 1, in which the present invention may be provided. The electronic apparatus 1 may be a portable or handheld mobile radio communication equipment, a mobile radio terminal, a mobile telephone, a pager, a communicator, an electronic organizer, a handheld electronic device, a smartphone, or a multimedia player, such as an MP3 player. These examples of an electronic apparatus, in which the invention may be provided, are not exhaustive. The invention may be implemented in any electronic device.

The electronic apparatus 1 comprises a man-machine interface, through which a user may interact with and operate the electronic apparatus 1. The man-machine interface may comprise various input devices, such as a keypad comprising one or several keys 10, and a joystick or rocker pad 11. The input devices may be used for inputting information and/or initiating various commands associated with a certain application. One or several of the input devices may be associated with a plurality of images, which are provided or displayed within a single physical area of the input device and which may indicate the function of the input device. Each image may be associated with a certain operational mode of the electronic apparatus. For example, in a first mode a certain key may be used for inputting information, e.g. a "1" in a communication mode. In a second mode, said certain key may be used for executing or initiating a command, such as a "play" command in a multi-media mode. Thus, images for "1" and "play" may be provided or displayed in the physical area defined by said certain key.

A single image may be provided to form a single symbol. Alternatively or additionally, a single image may be used to form a portion of a symbol. Thus, a first and a second sub-image may be used to form a single image when the first and the second sub-images are displayed simultaneously.

In the following, reference will be made to a first and a second symbol and the displaying thereof. However, a first and a second image may equally be displayed. Each of the first image and the second image may, but does not necessarily need to, comprise a symbol or a portion thereof.

According to the invention, the symbols may be alternatingly generated. Thus, only one symbol at the time will be displayed in said physical area.

Figure 2:
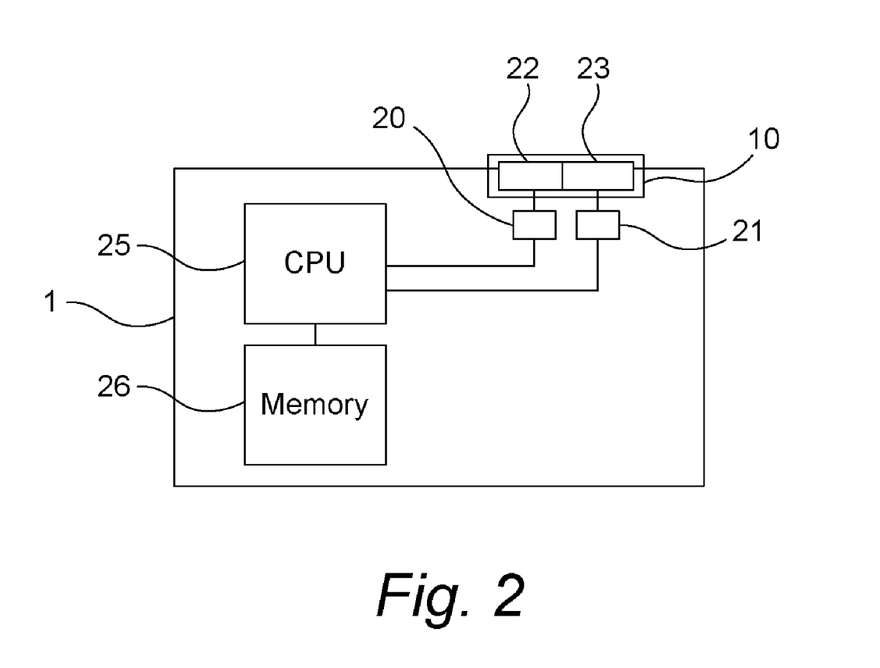
FIG. 2 is a block diagram of the electronic apparatus.

FIG. 2 illustrates some components of the electronic apparatus 1. An arrangement for displaying at least a first and a second symbol in a single physical area is provided. The arrangement comprises at least one light source. In the embodiment of FIG. 2, the arrangement comprises a first light source 20 and a second light source 21. At least a first image forming element 22 and a second image forming element 23 are arranged to generate a first and a second symbol, respectively. The symbols may be displayed within a single physical area, such as a single key 10 of the keypad.

A single light source or the first and the second light sources 20, 21 is/are arranged to generate light having a first and a second light characteristic. The first and the second light characteristic may be a first and a second spectral range, respectively. In one embodiment, the first and the second spectral ranges are non-overlapping. In another embodiment, the spectral ranges are at least partly overlapping. Alternatively, light within a single spectral range is generated. However, the intensity of light having different frequency ranges may be different within the single spectral range. Thus, the first light characteristic and the second light characteristic may be a first and a second intensity for different frequencies of the spectral range.

The first image forming element 22 may be associated with the first light source 20. The second image forming element 23 may be associated with the second light source 21. Thus, the first symbol may be generated and appear at the input device by switching the first light source 20 on. Similarly, the second symbol may be generated or appear at the input device by switching the second light source 21 on. The first and the second light source 20, 21 may be alternatingly switched on. Consequently, the first and the second symbol may be alternatingly generated in dependency of the current function of the input device associated with the first and second symbols. Alternatingly generating the first and the second symbol has the advantage that it will not be confusing for the user as only the current function of the input device is indicated by the symbol.

The arrangement may also comprise a processor 25, such as a CPU (Central Processing Unit), which is adapted to control the switching on/off of the first and the second light source 20, 21. The arrangement may also comprise one or several memories, which are jointly illustrated by memory 26. Memory 26 may e.g. comprise a ROM (Read Only Memory), a RAM (Random Access Memory), a flash memory, and/or a non-volatile memory.

The first and the second light source 20, 21 may be provided by a LED (Light Emitting Diode), such as a monochrome LED or an RGB (Red Green Blue) LED, a discharge tube, such as a cold cathode ray tube, or an electroluminescent plate or foil. If a single light source is provided, it may e.g. be a RGB LED.

The first image forming element 22 may comprise a first optical component for providing light having a first characteristic. The second image forming element 23 comprises a second optical component for providing light having a second characteristic. The second characteristic may, but does not need to be, different from the first characteristic. The optical component may e.g. comprise a grid, a transparent light guiding material, a light filter, a color filter, or phosphorescent material. The optical components may be transmissive components and/or serve to transfer light from the light sources 20, 21. The first and the second characteristic of the light generated by the optical components may e.g. be a spectral range, or an optical polarization of the generated light.

The first optical component may at least be responsive to the light having the first light characteristic. The second optical component may at least be responsive to the light having the second light characteristic. Furthermore, the first image forming element 22 may be arranged to not be responsive to the light having the second light characteristic. The second image forming element 23 may be arranged to not be responsive to the light having the second light characteristic. Thus, even if the first image forming element 22 is exposed by light having the first light characteristic, it will not be affected by it or transfer the light. Similarly, even if the second image forming element 23 is exposed by light having the first light characteristic, it will not be affected by it or transfer the light. However, in another embodiment, the first image forming element is responsive to the light having the second light characteristic, and the second image forming element 23 is responsive to the light having the first light characteristic.

The first light source 20 may be adapted to generate light within a first spectral range. The second light source may be adapted to generate light within a second spectral range. The second spectral range may be different from the first spectral range. Thus, if the spectral ranges are different, the light sources may provide light having different colors, wherein it will be easy to distinguish each symbol. The spectral range of the light may be associated with the operation mode of the electronic apparatus 1. Thus, the operational mode may be determined simply by identifying the color of the symbol; the form of the symbol need not be identified.

Figure 3A:
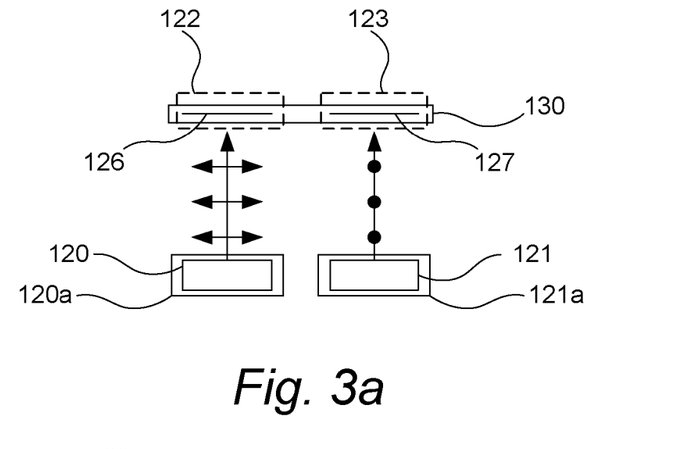
FIG. 3a is a cross-sectional view of a first embodiment of an arrangement for generating images.
Figure 3B:
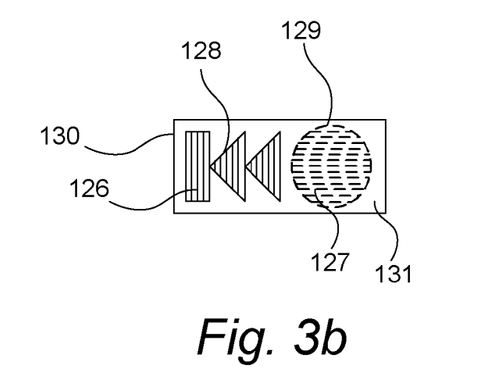
Figure 3C:
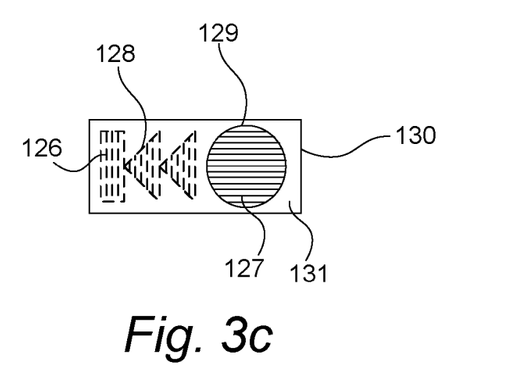

FIGS. 3a-3c illustrate an embodiment of the arrangement for alternatingly generating the first and the second symbol in more detail. The arrangement may comprise a first light source 120 and a second light source 121. The first light source 120 may be adapted to generate planar polar light having a first polarization. The first polarization is indicated with arrows in FIG. 3a and may be the first light characteristic. The second light source is adapted to generate planar polar light having a second polarization, which is different from to the first polarization and may be the second light characteristic. The first polarization may be orthogonal to the second polarization. The second polarization is indicated with dots in FIG. 3a.

The planar polar light may be generated by a light source for generating divergent light, such as a LED, and e.g. a grid, crystal or a polarization material, that transforms divergent light with circular polarization into planar polar light. The first light source 120 may e.g. be adapted to generate divergent light. A first planar polar filter, such as a grid, for planar polarize the divergent light may be attached to a first transparent covering 120a, which at least partly surrounds the first light source 121. Similarly, the second light source 121 may be adapted to generate divergent light. A second planar polar filter, such as a grid, for planar polarize divergent light may be attached to a second transparent covering 121a, which at least partly surrounds the second light source 121. The light sources 120, 121 and the transparent coverings 120a, 121a may be attached to a PCB (Printed Circuit Board). The orientation of the light sources 120, 121 on the PCB is not associated with the orientation of the planar polar filters.

The first image forming element 122 may comprise an optical component 126. The second image forming element 123 may comprise a second optical component 127. Each of the first and the second optical components 126, 127 may be a light filter, such as grid. The first optical component 126 may be adapted to transfer planar polar light from the first light source 120. If the first optical component is a grid, the rasterization of the grid serving as the first optical component 126 should be substantially orthogonal to the polarization of the planar polar light from the first light source 120 to transfer the light. The second optical component 127 may be adapted to transfer planar polar light from the second light source 121. Similarly, if the second optical component 127 is a grid, the rasterization of the grid serving as the second optical component 127 should be substantially orthogonal to the polarization of the planar polar light from the second light source 121 to transfer the light from the second light source 121. Planar polar light from the first light source 120 will pass through the first optical component 126. Consequently, the first optical component 126 is at least responsive to light having the first light characteristic and provides light having a first characteristic. The first characteristic of the light from the first optical component 126 in this embodiment may be the polarization of the planar polar light, which will pass the first optical component 126. Similarly, planar polar light from the second light source 121 will pass through the second optical component 127. Consequently, the second optical component 127 is responsive to the light having the second light characteristic and provides light having a second characteristic. The second characteristic of the light provided by the second optical component 127 is in this embodiment the second polarization of the planar polar light, which will pass the second optical component 127.

If the polarization of the first optical component 126 is substantially orthogonal to the polarization of the second optical component 126, and the polarization of the planar polar light generated by the first light source 120 is substantially orthogonal to the planar polar light generated by the second light source 121, the second optical component 127 will pass essentially no light from the first light source 120 and pass essentially all light from the second light source 121. Similarly, the first optical component 126 will pass essentially no light from the second light source 121 and pass essentially all light from the first light source 120. Thus, the first image forming element 122 may be arranged to not be responsive to the light having the second light characteristic. The second image forming element 123 may be arranged to not be responsive to light having the first light characteristic.

In another embodiment, the light source 120 and light source 121 may additionally or alternatively be arranged to generate light in a first and a second spectral range, respectively. The spectral ranges may be the first and the second light characteristic, respectively. Also, the spectral ranges may be the characteristics of the light provided by the optical components 126, 127.

The first image forming element 122 and the second image forming element 123 may be arranged to generate the first and the second symbol in a single physical area 130. The single physical area may be a single key of a keypad. The first and the second optical component 126, 127 may be formed as the first and the second symbol, respectively. The optical components 126, 127 may be integrated in a surface film, which are attached to a carrier, such as the key 10. Under the key 10 may be provided a dome of the keypad. The first and the second light source 120, 121 may be positioned at a first and a second side of the dome. Thus, the first and the second symbol are in the embodiment of FIGS. 3a-3c non-overlapping. FIG. 3b illustrates the appearance of the physical area when the first light source 120 is switched on and the second light source 121 is switched off, wherein the first symbol 128 appears. Symbol 129 is shown in phantom lines for illustrative purposes to indicate its position. However, symbol 129 will be virtually invisible when the second light source 121 is switched off. Similarly, FIG. 3c illustrates the appearance of the physical area when the second light source 121 is switched on and the first light source 120 is switched off, wherein the second symbol 129 appears. Symbol 128 is shown in phantom lines for illustrative purposes to indicate its position. However, symbol 128 will be virtually invisible when the first light source 120 is switched off. In FIGS. 3b-3c, the lines of the optical components 126, 127 is shown for illustrative purpose for indicating the polarization. However, in a real implementation, the lines will be practically invisible.

Each of the first and the second image forming elements 122, 123 may comprise a transparent element 130 and a non-transparent portion 131. The transparent element may be a key made of transparent material, such as plastic or rubber. The non-transparent portion may be a pattern printed on the key. The non-transparent portion may form contours of the first and the second symbols 129, 130. The transparent element may provide the carrier for the first and the second optical component 126, 127.

Figure 3D:
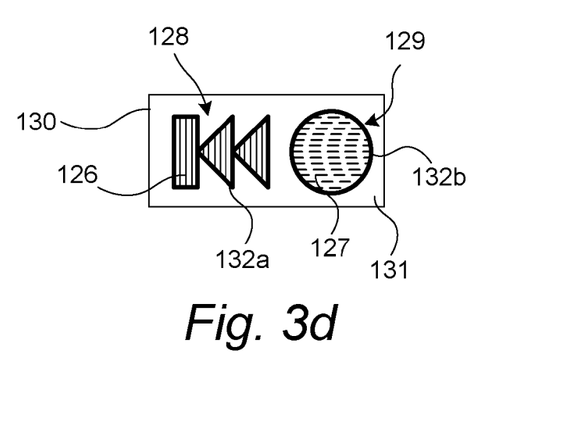

FIG. 3d illustrates an alternative embodiment wherein a first and a second contour 132a, 132b of each of the first and the second symbols 128, 129 is formed on the non-transparent portion 131. The contour may be made of phosphorous material, which excites in daylight. The phosphorous material may be transparent for the light generated by the light sources 120, 121. Thus, the contours will not essentially invisible when the light sources 120, 121 are illuminating the contours 131a, 131b. If a transparent material is provided as support instead of the non-transparent portion, the contours 132a, 132b may be provided in said support. It is an advantage of this embodiment that the signs will be visible in daylight. If the intensity of the daylight is too high, the light from the light sources 120, 121 may not be visible when the arrangement is exposed to daylight. However, the contours will be visible even if both symbols are visible simultaneously. This may not be any problem if the functions associated with two symbols of a single key are not related, such as a "5" and "play-symbol". If the electronic apparatus is in a music mode, it will be apparent that the function associated with the key is "play".

Figure 4A:
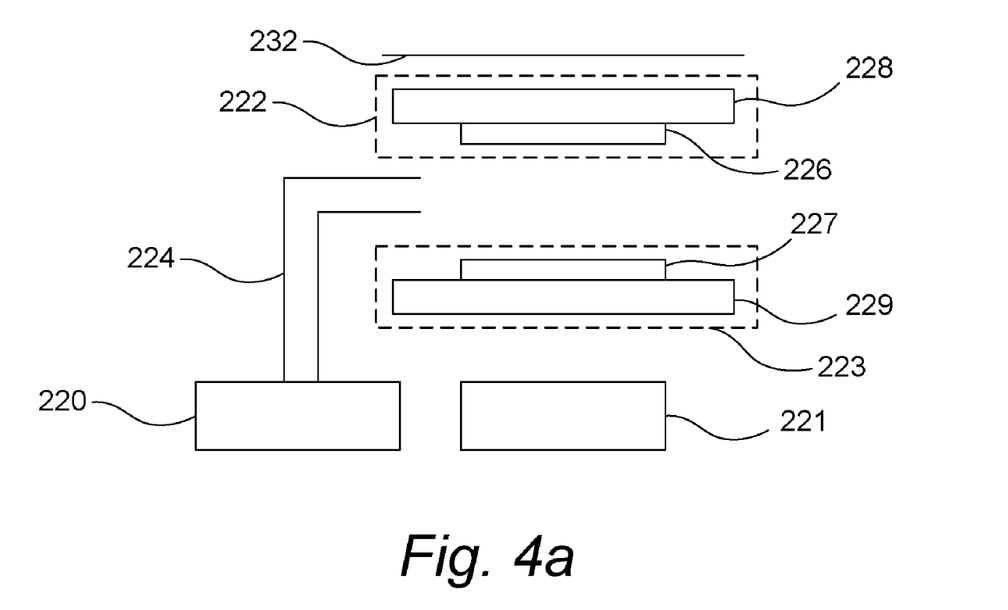
FIG. 4a is a cross-sectional view of a second embodiment of the arrangement for generating images.
Figure 4B:
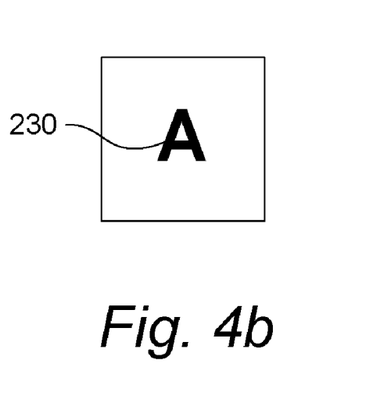
Figure 4C:
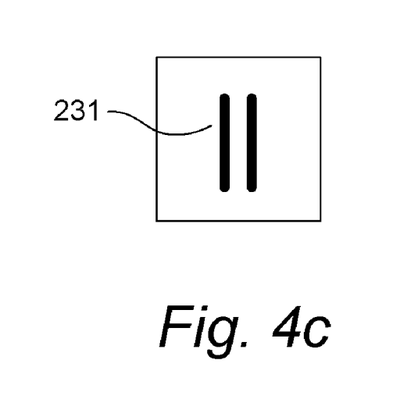

FIGS. 4a-4c illustrate an embodiment of the arrangement for alternatingly generating at least a first and a second symbol. The arrangement comprises at least one light source. In the embodiment shown in FIGS. 4a-4c a first and a second light source 220, 221 are provided. The arrangement also comprises at least a first and a second image forming element 222, 223. The first image forming element 222 is responsive to light having the first light characteristic. The second image forming element 223 is responsive to light having the second light characteristic. The light having the first light characteristic may be generated by the first light source 220. The light having the second light characteristic may be generated by the second light source 221.

The light generated by first light source 220 may be transferred therefrom to a location between the first and the second symbol generating element 222, 223 by means of a light guide 224. The light guide 224 may e.g. be provided by an optical fiber or as a cut-out in a keypad between individual keys thereof. The first light source 220 may be positioned directly under the second image forming element 223. Alternatively, a single light source is used for generating light for each of the first and the second image forming elements 222, 223. Thus, a light guide may be provided also for the first light source 221.

The first image forming element 222 may comprise a first optical component 226. The second image forming element 223 may comprise a second optical component 227. The first optical component 226 may be provided on a first carrier 228. The second optical component 227 may be provided on a second carrier 229. In FIG. 4a, the thickness of the carriers 228, 229 and the optical components 226, 227 has been exaggerated for illustrative purposes to show their positions. In a real implementation, they may be substantially thinner.

The first optical component 226 provides light having a first characteristic. The first optical component may be a phosphorus material, which may be excited by light having the first light characteristic, which may be generated by the first light source 220. The first characteristic of the light generated by the first optical component 226 may be the spectral range of the light generated by the first optical component 226. To excite the phosphorus material, the first light source 220 is adapted to generate light having sufficient energy for exciting the phosphorus material, such as UV light. The energy for exciting the phosphorus material may be the first light characteristic. Thus, the first image forming element 222 is responsive to light having the first light characteristic, as it is excitable. The phosphorus material may have the shape or the contour of a first symbol 230.

The second optical component 227 may be a partly transparent film attached to the carrier 229. The film may comprise a non-transparent pattern forming the shape or contour of a second symbol 231. Alternatively, the second symbol 231 may be printed directly on the second carrier 223. The second optical component 227 may also comprise a color filter. Thus, the second characteristic of the light provided by the second optical component may be the spectral range of the light provided by the second image forming element 223. The second image forming element 223 is responsive to light having the second light characteristic, which may be generated by the second light source 221, e.g. by transferring the light having the second light characteristic. The second light source 221 may generate light in a second spectral range, which may be different from the spectral range of the light generated by the first light source 220.

The first image forming element 222 may be arranged closer to the exterior of a housing in which the arrangement is positioned, i.e. above, the second image forming element 223. Thus, as light from the first light source 220 is provided between the image forming elements 222, 223, the second image forming element 223 will not be responsive to light from the first light source. The first image forming element 222 is not responsive to the second light source 221 if the energy included in the light from the second light source 221 is insufficient for exciting the phosphorus material. The second light source 221 may e.g. generate red or orange light, which does not include enough energy for exciting the phosphorus material. Furthermore, if the phosphorus material is transparent to light generated by the second light source 221, the phosphorus material, i.e. the first symbol 230, will be virtually invisible when the second light source 221 is switched on and the first light source is switched off. Similarly, the second symbol 231 is virtually invisible when the first light source 220 is switched on and the second light source 221 is switched off.

The first image forming element 222 may comprise a filter for blocking light from the first light source 220, e.g. if the light generated by the first light source 220 is deleterious for the human eye. The filter may be provided by the first carrier 228, which may be made of a material that is non-transparent for light from the first light source 220. The material of the carrier 228 may e.g. be plastic, which absorbs UV light. Alternatively, the first carrier 228 is covered by a covering 232, which acts as the filter and is non-transparent to light generated by the first light source 220. Thus, only light generated by the phosphorus material will pass the first image forming element 222 when the first light source 220 is switched on.

In one embodiment, contours (not shown) are formed on or within the covering. The contours may be formed as described in connection with FIG. 3d. Alternatively, the entire symbols may be formed rather than only the contours thereof.

In the embodiment of FIGS. 4a-4c, the first symbol 230 and the second symbol 231 may be alternatingly displayed in the same physical area. The first and the second image forming elements 222, 223 may be axially arranged. Thus, the first and the second symbol 230, 231 may be generated in an at least partly overlapping fashion, FIG. 4b illustrates the first symbol 230 when the electronic apparatus 1 is in a first mode, wherein the first light source 220 is switched on and the second light source 221 is switched off. In the first mode, the second symbol 231 is essentially invisible. FIG. 4c illustrates the second symbol 231 when the electronic apparatus 1 is in a second mode, wherein the second light source 221 is switched on and the first light source 220 is switched off. In the second mode, the first symbol 230 is essentially invisible.

The first and the second image forming element 222, 223 may be integrated into a single unit, such as a single key of a keypad. Alternatively, first and the second image forming element 222, 223 are arranged as separate units within a single physical area.

In another embodiment (not shown), the first light source 220 is provided together with the second light source 221. The light sources are provided under the second image forming element 223 when said second image forming element is arranged as in FIG. 4a. Thus, the second carrier 229 should be transparent at least for the light from the first light source 220. Furthermore, second optical component 227 may comprise a color filter forming the second symbol or the contour thereof. Said color filter may be transparent at least for light from the first light source 220 but block light from the second light source 221.

Figure 5A:
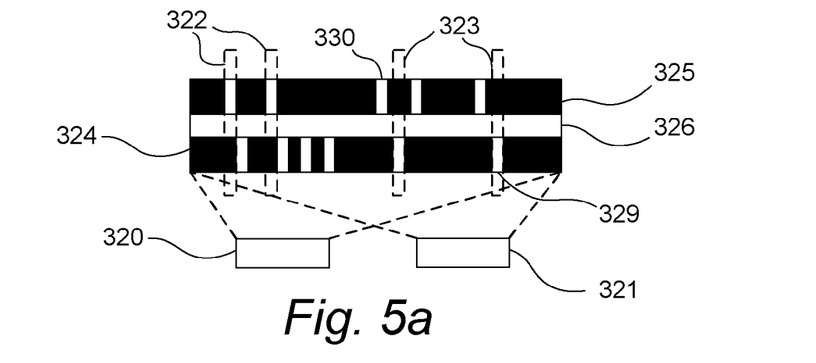
FIG. 5a is a cross-sectional view of a third embodiment of the arrangement for generating a first and a second image.
Figure 5B:
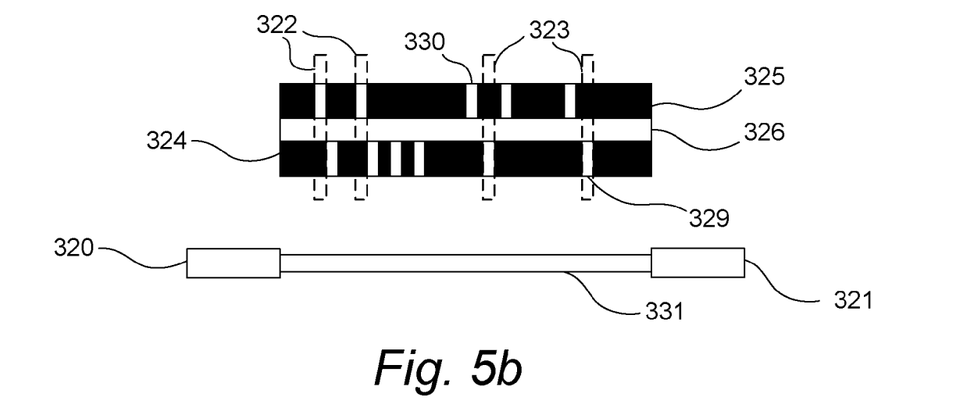
Figure 5C:
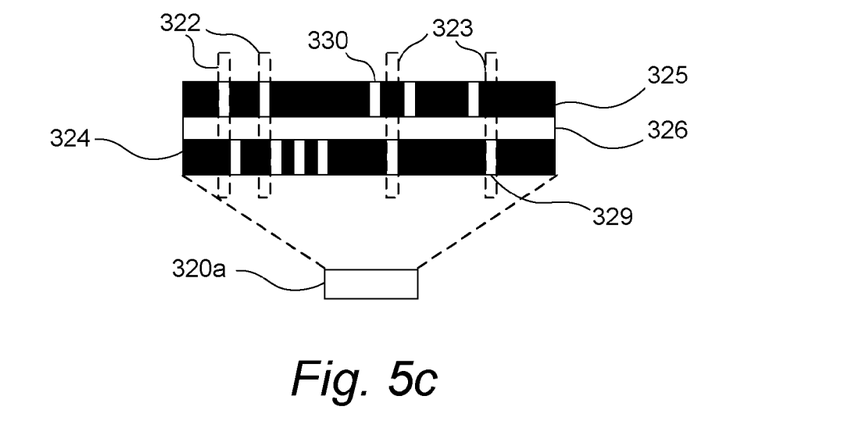

FIGS. 5a-5f illustrate another embodiment of the arrangement for alternatingly generating at least a first and a second symbol. The arrangement comprises at least one light source (FIG. 5c). In one embodiment (5a-5b) a first light source 320 and a second light source 321 is provided. A first image forming element 322 is responsive to light having the first light characteristic. A second image forming element 323 is responsive to light having the second light characteristic. The first image forming element 322 and the second image forming element 323 element are arranged to display the first and the second symbol, respectively, in a single physical area. The symbols may be generated in an at least partly overlapping fashion. The light sources 320, 321 may be arranged under the image forming elements 322, 323. Alternatively, light guides ends under the image forming elements 322, 323.

The image forming elements 322, 323 comprise optical components in the form of light filters, such as color filters. A first and a second color filter 324, 325 are arranged on respective surfaces, which may be opposite, of a carrier 326. The first color filter 324 is adapted to at least transfer light in a first spectral range, which is the first light characteristic. The second color filter 325 is adapted to at least transfer light in a second spectral range, which may be the second light characteristic.

The first light source 320 may be adapted to generate light in a spectral range, which is at least partly included in the spectral range of light that the first color filter 324 transfers. Thus, the first color filter 324 may be lit up by the first light source 320 and is thus responsive to light having the first light characteristic. The second light source 321 may be adapted to generate light in a spectral range, which is at least partly included in the spectral range that the second color filter 325 transfers. Thus, the second color filter 325 may be lit up by the second light source 321 and is thus responsive to light having the second light characteristic.

In one embodiment, the first color filter 324 is adapted to block or absorb light from the second light source 321. Thus, the first color filter 324 is not responsive to light having the second light characteristic. Similarly, the second color filter 325 may be adapted to block light from the first light source 320. Thus, the second color filter 325 is not responsive to light having the second light characteristic.

In another embodiment, the first color filter 324 transfers certain of the frequencies included in the light having the second light characteristic besides the light having the first light characteristic. Similarly, the second color filter 325 transfers certain of the frequencies included in the light having the second light characteristic besides the light having the first light characteristic. This may be provided e.g. if the spectral ranges of light from the first and the second light sources 320, 321 are partly overlapping. The first color filter 324 may be adapted to transfer light in the overlapping range from the first and the second light sources 320, 321, and transfer light from the first light source 320 in the non-overlapping range. The second color filter 325 may be adapted to transfer light in the overlapping range from the first and the second light sources 320, 321, and transfer light from the second light source 320 in the non-overlapping range. Thus, the color filters 320, 321 may have different appearance in dependence of the light source being lit. One or both of the light sources 320, 321 may be lit at the time.

In an alternative embodiment illustrated in FIG. 5c, a single light source 320a is used, e.g. provided by a RGB diode, which provides light within a single spectral range. The single light source 320a is be adapted to generate frequencies within the spectral range with different intensity distribution. The first and the second filters 324, 325 may adapted to be transfer light within substantially the entire spectral range. However, the first light filter 324 may be adapted to transfer light better for certain frequencies, such as the frequencies of blue light. The second light filter 324 may be adapted to transfer light better for certain other frequencies, such as the frequencies of red light. Thus, each of the color filters 324, 325 may generate distinguishable light.

In still another embodiment, the first and the second light sources 320, 321 generate light within a certain spectral range. However, the intensity of for frequencies within the spectral range is not uniform. For example, the first light source 320 may generate light having a first intensity distribution within the spectral range. The second light source 321 may generate light having a second intensity distribution, which is different from the first intensity distribution. For example, the first light source 320 may generate blue light and red light, wherein the blue light have higher intensity than the red light. The second light source 321 may generate blue light and red light, wherein the blue light has lower intensity than the red light. Thus, the color filters 324, 325, if they are blue and red color filters, respectively will be lit up by light from the first and the second light source 320, 321. However, the color filters 324, 325 will have different appearances depending on whether the first or the second light source 324, 325 is lit.

What has been described with regard to using the intensity as the light characteristics is also applicable to the embodiments described with regard to FIGS. 3a-3d and 4a-4c.

The first and the second light sources 320 321 are arranged to illuminate substantially the entire surfaces, which face towards said light sources, of the first and the second color filter 324, 325. This has been indicated with phantom lines in FIG. 5a.

A first screen pattern 327 may be formed in the first color filter 324 and a second screen pattern 328 may be formed in the second color filter 325. Each screen pattern 327, 328 does not overlap the other screen pattern. The screen patterns may comprise one or several cut-outs 329, 330 formed by geometric primitives, such as polygons, e.g. squares, rectangles, and triangles, or circles. The screen patterns 327, 238 may form the first and the second symbols. The cut-outs 329, 330 may form the contours of pixels in the opposing color filter 324, 325. For example a pixel having a first color may be formed by the first color filter 324 and a cut-out in the second color filter. Similarly, a pixel having a second color may be formed by the second color filter 325 and a cut-out in the first color filter. Light having the first light characteristic will pass the first color filter 324 and will pass the second color filter 325 at the positions of the cut-outs 329 of the second screen pattern 328. Similarly, light having the second light characteristic will pass the first color filter 324 at the positions of the cut-outs 330 of the first screen pattern 327 and will pass through the second color filter 325.

The first image forming element 322 comprises the first color filter 324 together with the cut-outs 330 of the second screen pattern 328 in the second color filter 325. Similarly, the second image forming element 323 comprises the second color filter 325 together with the cut-outs 329 of the first screen pattern 327 in the first color filter 324.

The color filters 324, 325 may be integrated into a component, such as key. The component may also serve as carrier 326.

FIG. 5b illustrates an alternative embodiment of the arrangement of the first and the second light sources 320, 321. The first and the second light sources 320, 321 are arranged at respective ends of a light guide 331. Light emitted by said light sources 320, 321 is transferred through the light guide towards the color filters 324, 325. The extension of the light guide 330 may essentially correspond to the extension of the first and second color filters 324, 325. However, the extension of the light guide 331 may be smaller than the extension of the color filters 324, 325, as long as substantially the entire surfaces, which face towards the light guide, of the first and second color filters 325, 325 are illuminated by light transmitted by the light guide 331. The embodiment of FIG. 5b has the advantage of providing a compact design at the same time as sufficient illumination is provided.

Figure 5D:
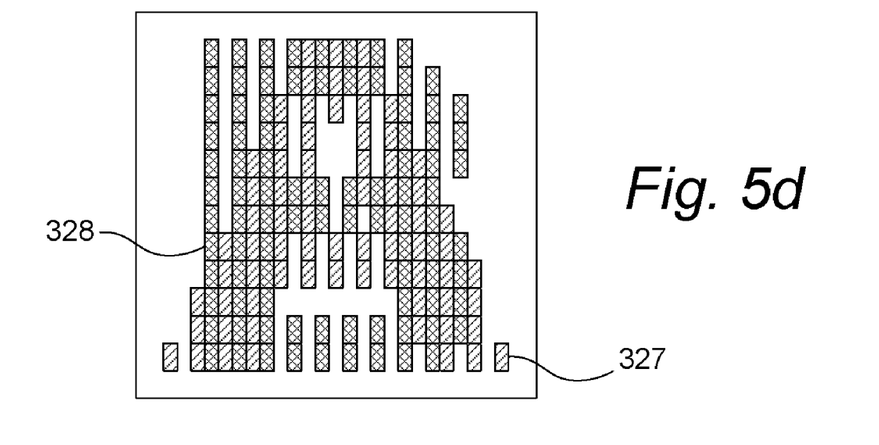
FIGS. 5d-5f are top views of screen patterns for generating the first and the second image according to the embodiments of FIG. 5a-5c.

In FIG. 5d, the first and the second screen pattern 327, 328 are shown together in a non-overlapping fashion. However, the screen patterns 327, 328 may also be partly overlapping, if it is desired to always let through light from either of the first or the second light source 320, 321.

Figure 5E:
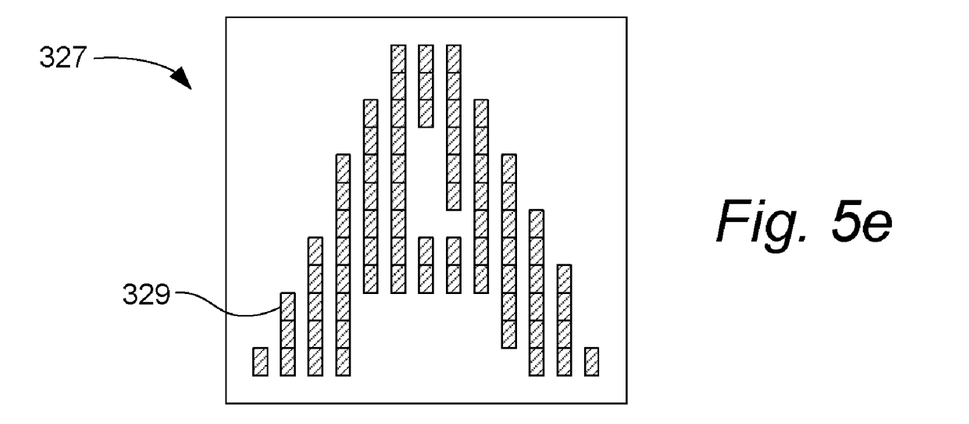
Figure 5F:
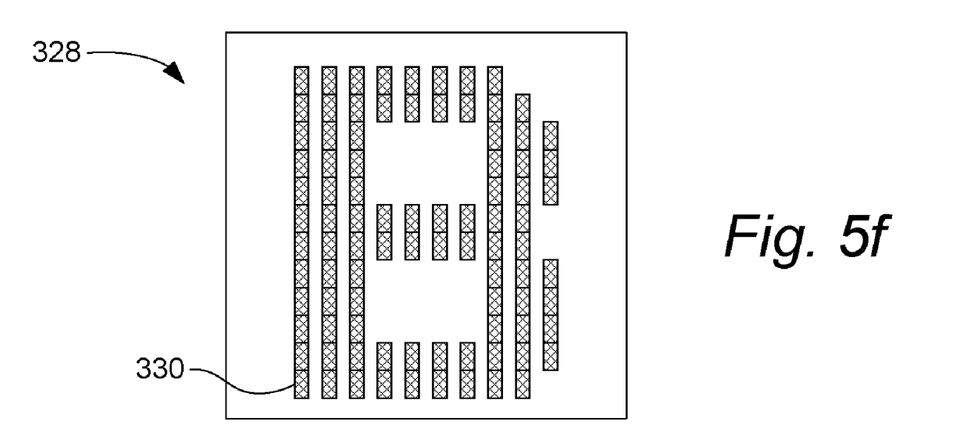

In FIG. 5e, the first screen pattern 327 forming the first symbol is shown when the first light source 320 is switched on and the second light source 321 is switched off, wherein pixels formed by the second screen pattern 328 is virtually invisible. In FIG. 5f, the second screen pattern 328 forming the second symbol is shown when the second light source 321 is switched on and the first light source 320 is switched off, wherein pixels formed by the first screen pattern 327 will be virtually invisible.

In an alternative embodiment, the arrangement according to FIGS. 5a-5f may be used for providing a multi-color image. The first and the second light source 320, 321 may be switched on simultaneously. Thus, the symbols generated by the first and the second image forming element 322, 323 may form a multi-color image or multi-color symbol. Each symbol may form a partial image.

The screen patterns 327, 328 are shown in low resolution in FIGS. 5d-5f for illustrative purposes. In a real implementation, the resolution may be substantially higher.

In another embodiment, the arrangement comprises more than two image forming elements and a possibly corresponding number of light sources for generating a corresponding number of symbols. This may be provided according to the technique disclosed in FIGS. 5a-5f. Adding one or several additional color filters, which each include a screen pattern, and light sources may provide further symbols in a corresponding manner as described with regard to FIGS. 5a-5f. Alternatively, a combination of the embodiment of FIGS. 4a-4c and the embodiment of FIG. 5a-5f may be utilized. A first and a second symbol may be generated according to the embodiment of FIGS. 5a-5f. A third symbol may be generated by axially arranging a phosphorus layer forming the third symbol together with the color filters 324, 325. A third light source may provide light for exciting the phosphorus layer.

In one embodiment, contours (not shown) are formed on or within a layer support axially arranged above the second color filter 325 and be exposable to daylight. The contours may be formed as described in connection with FIG. 3d. Alternatively, the entire symbols may be formed rather than only the contours thereof.

Figure 6:
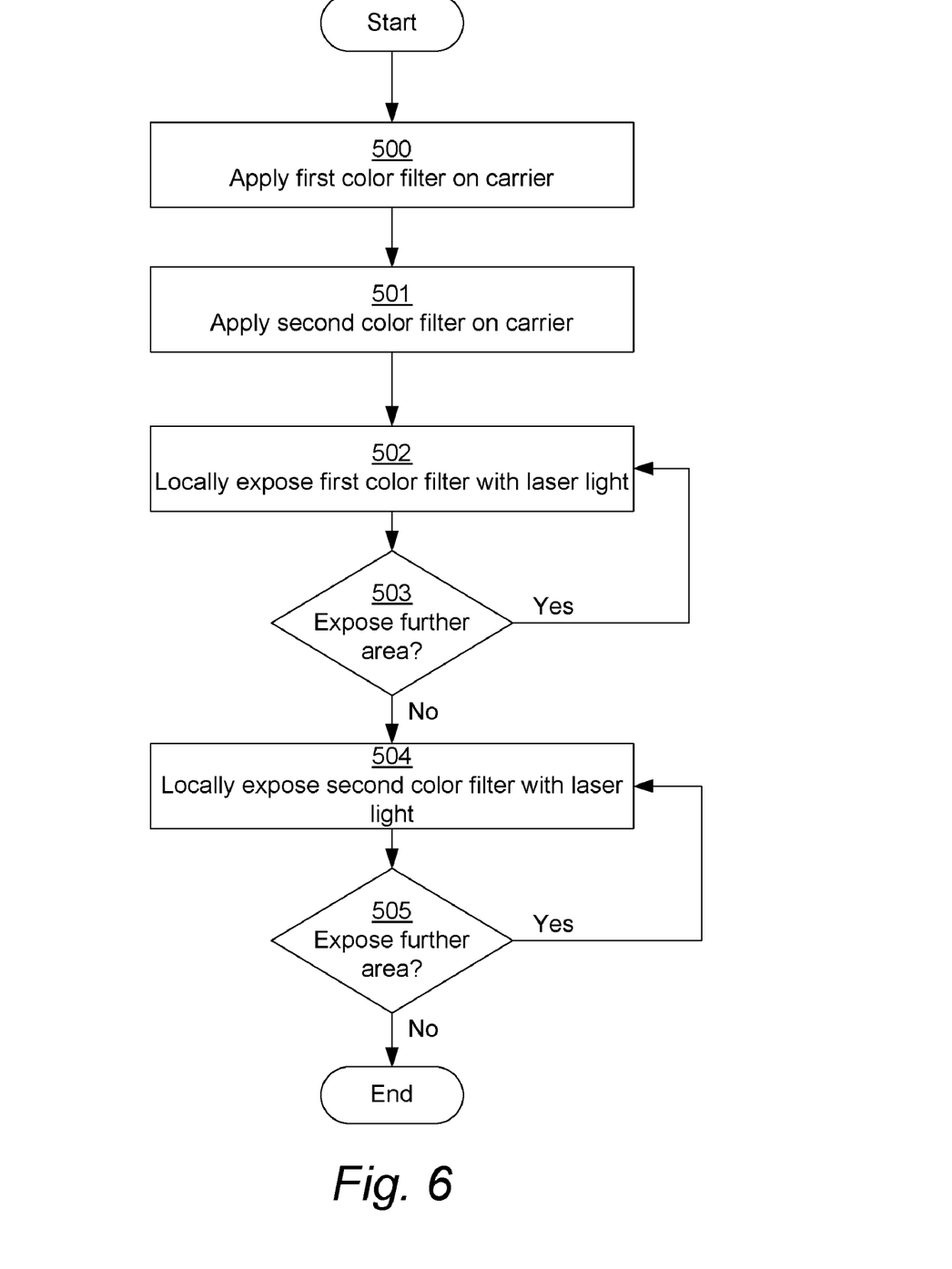
FIG. 6 is a flow-chart of a method for generating an image forming element.

FIG. 6 illustrates a method for manufacturing the image forming elements 322, 323 according to the embodiment of FIGS. 5a-5d. In a first step 500, the first color filter 324 is applied on a first surface of the carrier 326. In a second step 501, the second color filter 325 is applied on a second surface of the carrier 326. The color filters 324, 325 may be applied e.g. by printing, molding or depositing them on the carrier 326. The first color filter 324 may have a first color, such as blue. The second color filter 325 may have a second color, such as red. Thus, red light is absorbed by the first color filter 324. Blue light is absorbed by the second color filter 325. The carrier 326 has negligible absorption of both red and blue light. The carrier may be made of transparent material, such as transparent plastic, such as polycarbonate, or polyamide, silicon rubber, or glass. In step 502, the first color filter 324 is locally exposed by laser light having a color corresponding to the color of the second color filter 325, red in this embodiment. A laser may generate the laser light. Thus, the red light is absorbed by the first color filter 324. For sufficiently large intensities, the first color filter 324 may be locally heated and evaporated at the exposed area. Thus, a cut-out is provided in the first color filter 324 at the exposed area, and a red pixel is generated. No absorption of the red light takes place in the carrier 326 or in the second color filter 325. In step 502, it is determined whether any further location of the first color filter 324 should be exposed by red laser light, i.e. whether any further cut-out should be made in the first color filter 324. If the answer in step 502 is yes, the procedure returns to step 501, wherein another portion of the first color filter 324 is exposed by the laser light. If the answer in step 503 is no, the procedure proceeds to step 504. In step 504, the second color filter 325 is exposed by laser light having a color corresponding to the color of the first color filter 324, blue in this embodiment. The laser light may be generated by a laser generating blue light. Alternatively, an adjustable laser may be utilized, which is tunable to generate either red or blue light. The blue light is absorbed by the second color filter 325. As for the first color filter 324, for sufficiently large intensities, the second color filter 325 may be locally heated and evaporated at the exposing area. Thus, a cut-out is provided in the second color filter 325 at the exposed area, and a blue pixel is generated. No absorption of the blue light takes place in the carrier 326 or in the first color filter 324. In step 505, it is determined whether any further location of the second color filter 325 should be exposed by blue laser light, i.e. whether any further cut-out should be made in the second color filter 325. If the answer in step 505 is yes, the procedure returns to step 504, wherein another portion of the second color filter 325 is exposed by the laser light. If the answer in step 505 is no, the procedure ends.

The invention may at least partly be embedded in a computer program product, which enables implementation of the method and functions described herein. The invention may be carried out when the computer program product is loaded and run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

The present invention has been described above with reference to specific embodiments. However, other embodiments than the above described are equally possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. An arrangement for displaying a first and a second image within a physical area of an input device for a man-machine interface, comprising
   at least one light source adapted to generate light having a first and a second light characteristic; and
   at least a first and a second image forming element arranged to display a first and a second image, respectively; wherein
   the first image forming element is at least responsive to the light having the first light characteristic; and
   the second image forming element is at least responsive to the light having the second light characteristic; and
   a covering, comprising
   a third image forming element consisting of at least contours of the first and second image, the contours comprising a phosphorous material;
   wherein the phosphorous material is transparent to the light having the first and the second light characteristics generated by the at least one light source, is excitable by daylight, and is disposed on or within the covering.

2. An electronic apparatus, comprising the arrangement according to claim 1.

3. The electronic apparatus according to claim 2, wherein the electronic apparatus is a portable or handheld mobile radio communication equipment, a mobile radio terminal, a mobile telephone, a pager, a communicator, an electronic organizer, a smartphone, a computer, or a multimedia player.

4. The arrangement according to claim 1, wherein the at least one light source is adapted to generate light in a first and second spectral range, wherein the first light characteristic is the first spectral range and the second light characteristic is the second spectral range.

5. The arrangement according to claim 1, wherein the at least one light source is adapted to generate light in at least one spectral range, wherein different frequencies of the spectral range have at least a first and a second intensity, wherein the first light characteristic is the first intensity and the second light characteristic is the second intensity.

6. The arrangement according to claim 1, comprising a first and a second light source, the first light source being adapted to generate light having the first light characteristic, and the second light source being adapted to generate light having the second light characteristic.

7. The arrangement according to claim 1, wherein the first image forming element comprises a first optical component for providing light having a first characteristic, and the second image forming element comprises a second optical component for providing light having a second characteristic, which is different from the first characteristic.

8. The arrangement according to claim 7, wherein the first optical component is at least responsive to the light having the first light characteristic, and the second optical component is at least responsive to the light having the second light characteristic.

9. The arrangement according to claim 1, wherein the first image forming element is arranged to not be responsive to the light having the second light characteristic, and the second image forming element is arranged to not be responsive to the light having the first light characteristic.

10. The arrangement according to claim 1, wherein the first image forming element and the second image forming element are arranged to display the first and the second image, respectively, in a single physical area.

11. The arrangement according to claim 10, wherein the first image forming element and the second image forming element are arranged to display the first and the second images in a non-overlapping fashion.

12. The arrangement according to claim 7, wherein the first optical component comprises a first light filter and the second optical component comprises a second light filter.

13. The arrangement according to claim 12, wherein a first light source is adapted to generate planar polar light having a first polarization, the light filter of the first optical component is adapted to transfer planar polar light from the first light source, a second light source is adapted to generate planar polar light having a second polarization, which is different from the first polarization, and the light filter of the second optical component is adapted to transfer planar polar light from the second light source.

14. The arrangement according to claim 1, wherein each of the first image forming element and the second image forming element comprises a transparent element and a non-transparent portion for forming the first and the second image, respectively.

* * * * *